United States Patent [19]
Schuetz et al.

[11] 4,051,375
[45] Sept. 27, 1977

[54] DISCRIMINATING FLAME DETECTOR

[75] Inventors: Adolph August Schuetz, East Hampton; Gary Edward Bossak, Bristol, both of Conn.

[73] Assignee: Combustion Engineering, Inc., Windsor, Conn.

[21] Appl. No.: 646,087

[22] Filed: Jan. 2, 1976

[51] Int. Cl.² ............................................. G01J 1/42
[52] U.S. Cl. .................................................. 250/372
[58] Field of Search ...................................... 250/372

[56] References Cited

U.S. PATENT DOCUMENTS

| 3,130,310 | 4/1964 | Biberman et al. | 250/372 |
| 3,543,260 | 11/1970 | Engh | 250/372 X |
| 3,609,364 | 9/1971 | Paine | 250/372 |

Primary Examiner—Archie R. Borchelt
Attorney, Agent, or Firm—Joseph H. Born

[57] ABSTRACT

A device for discriminating between the presence of flame in a selected position and the presence of flame in nearby locations within a combustion area is disclosed. A means for detecting electromagnetic radiation having wavelengths known to be characteristic of the base of the flame but not of the rest of the flame is aimed at the position at which the base of the flame to be monitored will occur if the flame is present. The intensity of the radiation having the given wavelengths is compared with the intensity of radiation having nearby wavelengths, and the relative magnitudes of the two intensities are used as an indication of whether flame is present or absent at the selected position.

8 Claims, 8 Drawing Figures

DISCRIMINATING FLAME DETECTOR

BACKGROUND OF THE INVENTION

In utility boilers and other devices in which fossil fuels are burned, safety considerations dictate that flame be continuously present near each point at which fuel is introduced. Toward this end various devices have been proposed and used which monitor the presence or absence of flame and close down the fuel supply when flame disappears. In the design of these flame detectors, particularly those for use in multiple-burner furnaces, a problem which must be dealt which is how to discriminate between the presence of flame at the location to be monitored and the presence of flame at other locations. It is to this problem that the method and apparatus of the present invention is addressed.

It is a commonplace within the art to detect electromagnetic radiation, particularly that in the ultraviolet range, and use the intensity level detected as an indication of the presence or absence of flame. This type of device, of course, responds not only to radiation reaching it from the flame to be monitored, but also responds to any other electromagnetic radiation reaching it, including any radiation which reaches it from nearby burners. Therefore, it is necessary to design the device in such a manner that it will not respond to an intensity of radiation that is below a level that can only be achieved by the flame to be monitored. This method will always work only if a range of intensities exists which cannot be achieved by the background flame and only if the flame to be monitored, when present, will not decrease below that range. However, if the range of intensities of radiation from the flame to be monitored overlaps the range of intensities of radiation from background flame, then conditions exist which will cause this method to give incorrect readings. In addition, smoke and the accumulation of dirt on the face of the detector may render the device sufficiently insensitive that it will shut off fuel even when a fairly intense flame is present. Accordingly, it may be seen that effective use of a device of this type is a sometime thing.

SUMMARY OF THE INVENTION

It is therefore an object of the present invention to detect the presence or absence of a flame in a location to be monitored and to do this regardless of the intensity of the background radiation. It is another object of the present invention to indicate the presence or absence of flame even though the intensity of the radiation actually reaching the detection means varies throughout a relatively wide range.

The apparatus and method of the present invention use a peak wavelength that is characteristically strong in the radiation emitted by the base of the flame but not in the radiation emitted by the rest of the flame. The intensity of radiation of that wavelength is compared to a reference intensity, derived from the intensities of radiation of nearby wavelengths, which is an approximation of what the intensity will be at the peak wavelength if the radiation is from a non-base part of a flame. The resultant ratio is used as an indication of whether the radiation reaching the device is from a flame base or not. If the indication is that the radiation is from a flame base, then the presence of flame is indicated. Otherwise, the absence of flame is indicated. Thus, even if the background intensity is very high, if it does not exhibit a peak at the characteristic wavelength, the indication is that no flame is present. Also, since the indication is taken from a ratio of intensities, rather than an absolute intensity level, the indicator is insensitive to variations in the intensity of the flame at the chosen location and to drift in the sensitivities of the detecting devices.

DETAILED DESCRIPTION OF THE INVENTION

In a typical furnace, fuel such as gas, oil, or pulverized coal will enter the furnace from a fuel source at whose outlet flame will occur. This flame will emit radiation from its base characterized by the spectrum shown in FIG. 1. The peak 10, which occurs at around 3120 angstroms, appears in radiation emitted by the base of any flame which is burning organic fuel. The remainder of the flame does not exhibit this peaking characteristic, and the spectrum emitted by the flame outside of the base is shown in FIG. 2. According to the present invention, the arrangement shown in FIG. 13 is used in order to take advantage of this effect.

Figure 3:
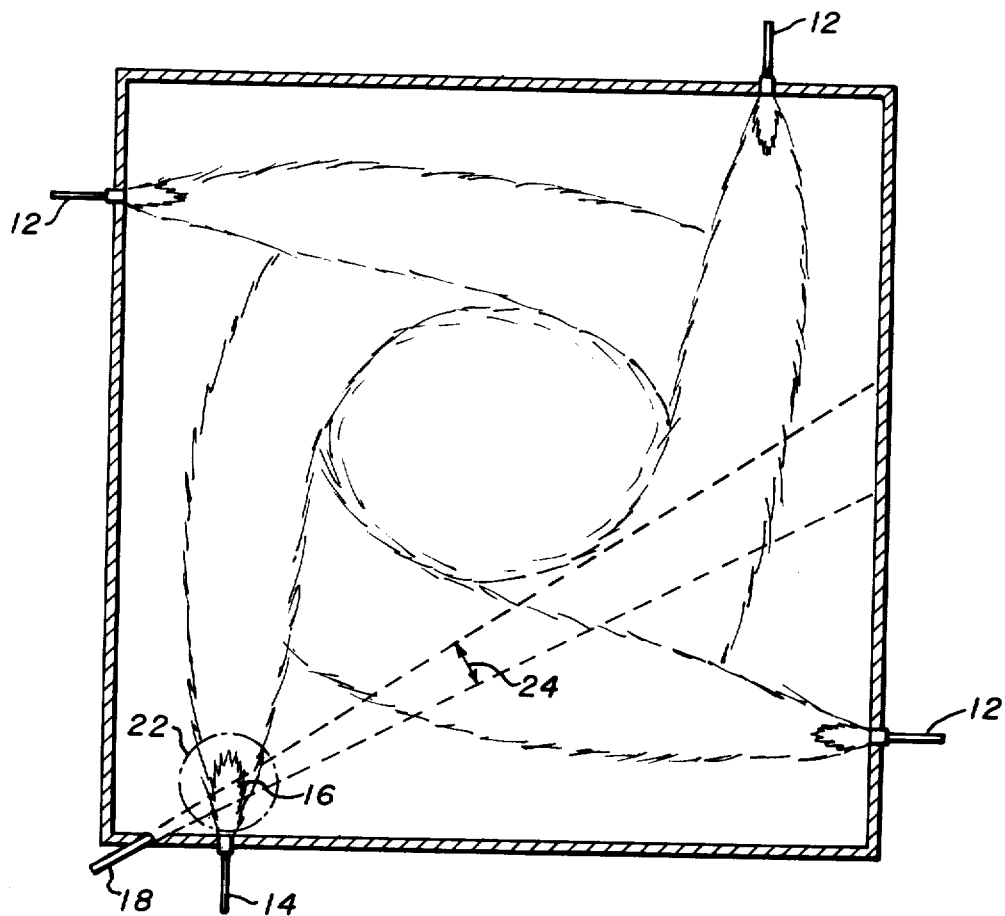
FIG. 3 is a diagram showing the typical position in a furnace of a flame detector according to the present invention.

Fuel may be introduced into a furnace through several sources such as those labeled 12 and 14 in FIG. 3. The presence of atomic species that only appear during the initial stages of combustion results in a flame base 16 which is localized at the outlet of fuel source 14. In order to receive radiation from the base 16 of the flame, a directional electromagnetic-radiation collector 18 is aimed at the location in which the base of the flame will occur if the flame is present in the selected position 22. Due to the directional nature of the electromagnetic-radiation collector 18, only radiation which is emitted or reflected by objects within a widening path 24 will cause a response from the electromagnetic-radiation collector 18. Thus, it can be seen that, while the electromagnetic-radiation collector 18 may see flame other than that at the selected position 22, the only flame base it will see is the one associated with flame in the selected position 22.

Figure 4:
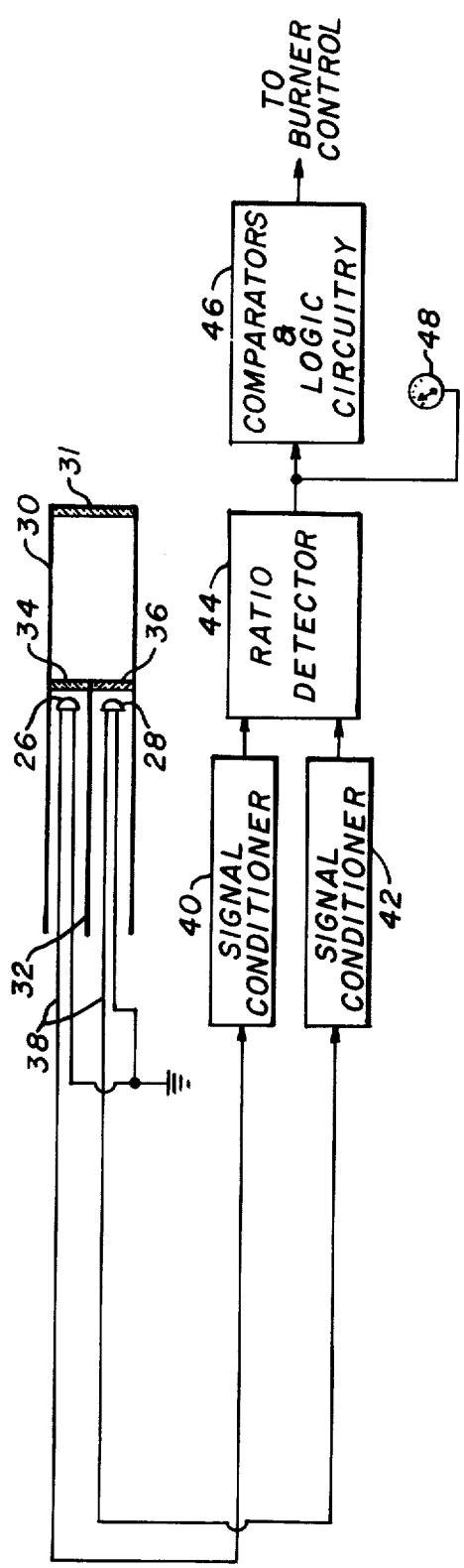
FIG. 4 is a diagram of one embodiment of the present invention.

One embodiment of a flame detector according to the present invention is shown in FIG. 4. In FIG. 4 two photodiodes 26 and 28 are mounted within tube 30. The tube may have a window 31 or other device which is transparent to the spectra to be detected but aids in shielding the photodiodes from heat and some of the wavelengths that are not of interest. A filter 34 which admits radiation within a first spectrum that includes wavelengths more characteristic of the base than of the rest of the flame is positioned in front of photodiode 26. In this case, the spectrum is centered on the wavelength at which the peak 10 of FIG. 1 occurs. Our measurements show that this peak occurs at 3120±20 angstroms. Together, tube 30, filter 34, and photodiode 26 constitute a means for producing a first signal indicative of the intensity of any electromagnetic radiation which reaches it from locations in a path comprising a set of locations which includes the location at which the base of the flame to be detected will occur if the flame is in the selected position. A second filter 36 which admits a second spectrum centered on a wavelength whose intensity is indicative of the general level of intensity in a neighborhood of the peak wavelength is placed in front of photodiode 28. In this case that wavelength is that of the valley 11 in FIG. 1. Our measurements show that this valley occurs at 3260±20 angstroms. In combination, tube 30, filter 36, and photodiode 28 constitute a means for producing a second signal indicative of the intensity of any electromagnetic radiation within a predetermined second spectrum which reaches it from locations in the path. A separation plate 32 prevents radiation which passes through filter 34 from reaching photodiode 28 and also prevents radiation which passes through filter 36 from reaching photodiode 26. Leads 38 conduct signals from photodiodes 26 and 28 to the associated circuitry. The signals from photodiodes 26 and 28 are passed through appropriate signal conditioning circuits 40 and 42, which provide the necessary bias, isolation, and filtering. The outputs of the signal conditioners 40 and 42 are applied to ratio detector 44, which is a means for producing a signal indicative of the ratio of the radiation intensities represented by the signals at its inputs. The output of the ratio detector 44 is fed to comparators and logic circuitry 46, whose output controls the fuel supply to the selected position 22. Fuel is only permitted to flow to that position when the output of ratio detector 44 is within certain limits. The output of the ratio detector 44 may also be fed to a monitoring indicator 48. The signal conditioners, ratio detectors, comparators and logic circuitry, sample-and-hold circuits and averaging circuit are all conventional devices which are commercially available or can readily be constructed by well-known technology. The details of these devices are therefore not described herein.

Figure 1:
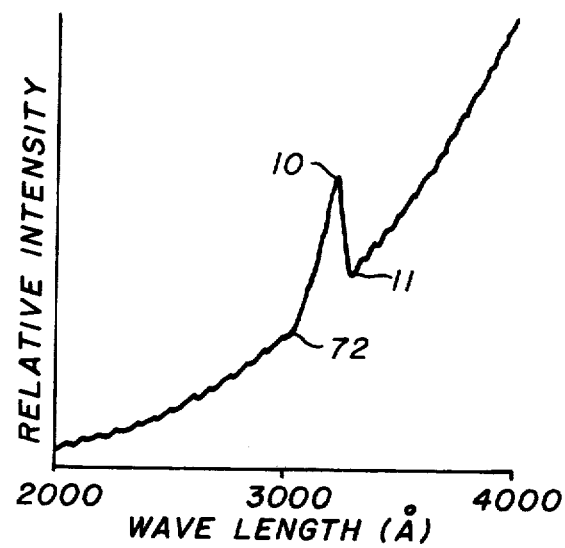
FIG. 1 is a plot of radiation intensity as a function of wavelength for the base of a flame.
Figure 2:
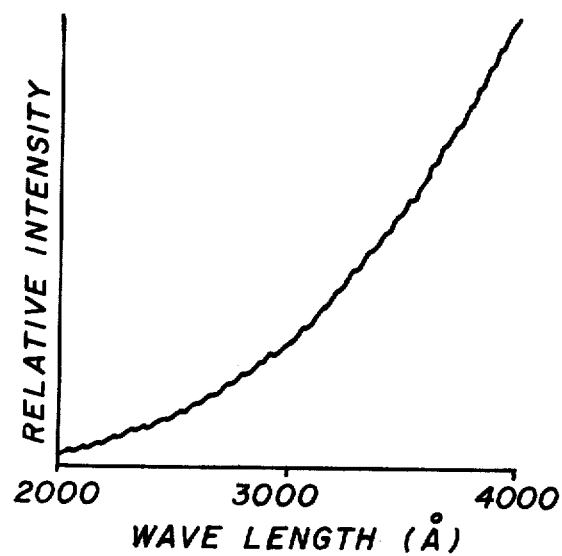
FIG. 2 is a plot of intensity as a function of wavelength for the remainder of the flame.

During operation, a flame base will normally occur at the position in which flame base 16 is shown in FIG. 3, and it will emit radiation having the partial spectrum shown in FIG. 1. Parts of the rest of the flame or of other flames will also be within the path 24, and they will emit radiation which has the partial spectrum shown in FIG. 2. Since these flames are in the path 24, some of the radiation from these non-base portions of other flames will also reach the electromagnetic-radiation collector 18. However, due to the relative proximity of the position at which the flame base 16 is to be expected and to the fact that this flame base 16 will to a great extent mask the flame behind it, the spectrum which the electromagnetic detector will see will closely approximate that in FIG. 1. However, even if the radiation from the flame base does not predominate, the peak will still occur due to the fact that the combination of intensities from the different sources is additive. The fact that a significant amount of radiation from behind the monitored flame base may reach the electromagnetic-radiation collector will only mean that the valley-to-peak ratio will be in a higher part of the acceptable range, not that it will be outside the range. Radiation passing window 31 will pass down tube 30 and will be filtered by filters 34 and 36. Filter 34 will pass a narrow spectrum centered on the peak 10 in FIG. 1. Filter 36 will pass another spectrum, this one centered on the valley 11 in FIG. 1. The intensity indicated by photodiode 28 will therefore be significantly lower than that indicated by photodiode 26, and the ratio will typically be within the range of 0.4 to 0.9. This value will be computed by ratio detector 44, comparators and logic circuitry 46 will indicate that the ratio is within acceptable limits, and this indication will permit fuel to be introduced by fuel source 14.

If the flame in the selected position 22 goes out, flame may still be present within path 24, so electromagnetic radiation may still reach electromagnetic-radiation collector 18. However, since no flame base is within path 24, the spectrum of the radiation which reaches electromagnetic collector 18 will be characterized by the spectrum of FIG. 2. In such a case, the radiation passed by filter 34 will have the same or even a lower intensity than the radiation passing through filter 36. As a result, the ratio indicated by ratio detector 44 will be unity or slightly greater. Comparators and logic circuitry 46 will receive this signal, and, since the indicated ratio is not within the limits of 0.4 to 0.9, it will send a signal which will cause supply of fuel to selected fuel source 14 to be cut off.

If a defect occurs in photodiodes 26 or 28 or the associated signal conditioners 40 or 42, the indication delivered to the ratio detector 44 will typically be of a very high or very low intensity. Either extreme will cause a signal from the ratio detector which is not of the expected type. That is, the ratio indicated by the ratio detector 44 will either be near zero or very high; it will not be near unity, indicating the absence of flame, or in the range of 0.4 to 0.9, indicating the presence of a flame. Comparators and logic circuitry 46 will still indicate that the ratio is not within the accepted limits, and the fuel supply will be cut off. But if, when the fuel supply is cut off, an operator consults monitoring indicator 48, he will see that the shutdown is caused by a defect in the apparatus, because the ratio indicates neither presence nor absence of flame.

It can be appreciated that the question of this device is not dependent upon the intensity of the electromagnetic radiation emitted by the flame; since the apparatus works on ratios, rather than absolute magnitudes, the absolute intensity value is relatively unimportant, and the apparatus will therefore function properly over a wide range of flame intensities. As a consequence, factors such as dirty windows, which affect the intensity of radiation seen by the detector, will be less likely to prevent successful operation of the device. In addition, the effect of a sensitivity drift due to aging in photodiodes 26 and 28 will be ameliorated, since the ratio effect will cancel out that part of the sentivitity drift which is common to both photodiodes.

Figure 5:
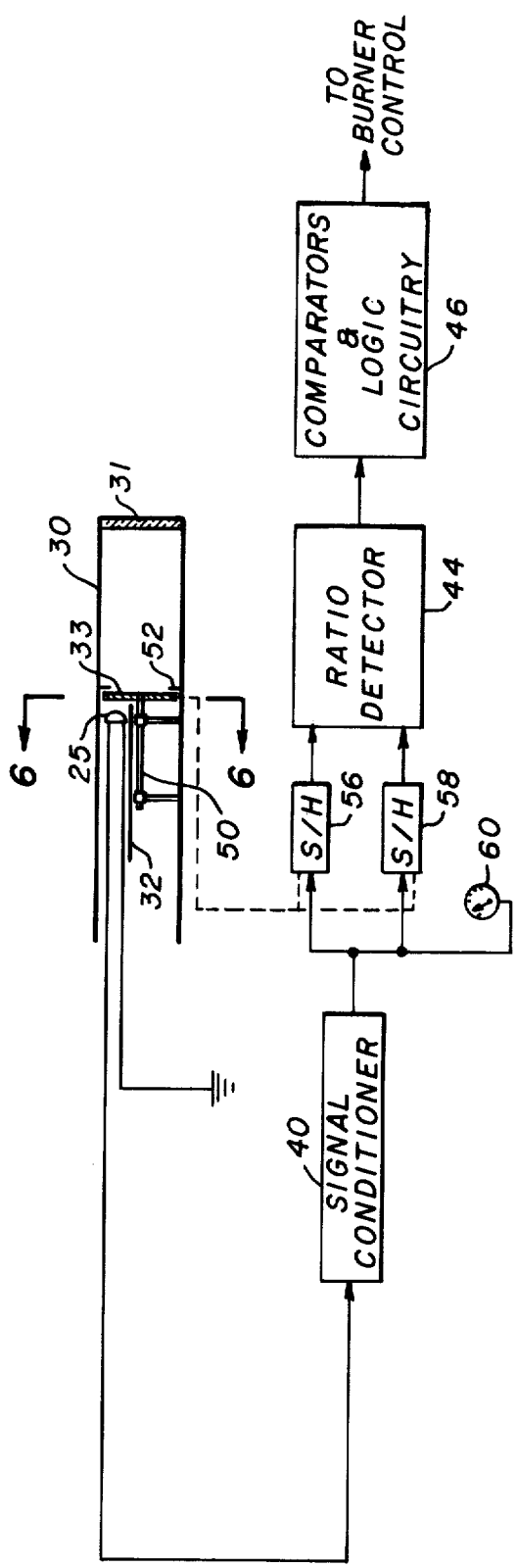
FIG. 5 is a diagram of another embodiment of the present invention.
Figure 6:
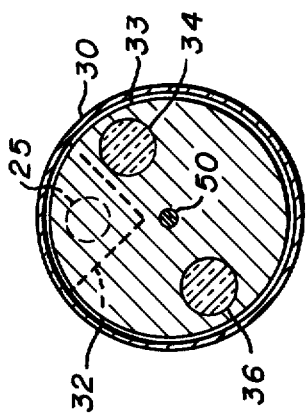
FIG. 6 is a cross-sectional view of an apparatus according to the embodiment of FIG. 5.

An alternate embodiment of the present invention which further reduces the effect of aging of the photodiodes is shown in FIGS. 5 and 6. FIG. 6 is a cross-sectional view of tube 30 of FIG. 5, which corresponds in purpose to tube 30 of FIG. 4. A disc 33 is disposed in front of photodiode 25, which is mounted within tube 30. Disc 33 is opaque in that part of its area not occupied by filters 34 and 36. Filter 34 is the peak filter corresponding to filter 34 of FIG. 4, and filter 36 is the valley filter corresponding to filter 36 of FIG. 4. A V-shaped separation tube 32 is used to permit radiation to reach photodiode 25 from only one filter at a time.

Referring now to FIG. 5, an axle 50 connects disc 33 to an appropriate motivating means not shown in the figure, which rotates disc 33. A ring-shaped lip 52 prevents passage of light around the disc.

The signal from photodiode 25 passes through a signal conditioner 40 to sample-and-hold circuits 56 and 58. Sample-and-hold circuits 56 and 58 are synchronized with the disc 33 so that circuit 56 is triggered while the outout of signal conditioner 40 is indicative of the intensity of light passing through filter 34, and circuit 58 is triggered while the output of signal conditioner 40 is indicative of the intensity of light passing through filter 36. Therefore, circuits 56 and 58 continuously present indications of the most recently sampled intensities from filters 34 and 36, respectively. The output of signal conditioner 40 is also fed to an a.c. meter 60, which indicates the average value of the a.c. component of the signal from signal conditioner 40. The remainder of the apparatus is the same as the embodiment of FIG. 4, with the exception that the monitoring indicator is eliminated.

During operation disc 33 rotates, bringing filters 34 and 36 alternately in front of the photodiode 25. When a filter is directly in front of photodiode 25, the sample-and-hold circuit 56 or 58 corresponding to the filter currently in front of the photodiode is triggered, thereby bringing the output of that sample-and-hold circuit up-to-date. Ratio detector 44 will thus receive two continuous signals as it did in the apparatus of FIG. 4, and the remainder of the operation is the same as that in the FIG. 4 embodiment. In this manner, the ratio indicated by ratio detector 44 is dependent only upon the relative intensities of radiation in the two spectra; the sensitivity drift of the photodiode is completely cancelled out by the ratio effect.

In this embodiment it is to be noted that, if the photodiode or signal-conditioning circuitry fail, ratio detector 44 will most likely indicate a ratio of unity, thereby causing the fuel supply to be shut down. This shutdown is the same result as that achieved by the embodiment in FIG. 4. However, unlike the embodiment of FIG. 4, the output of the ratio detector will not indicate whether the shutdown is due to a defect or the absence of flame, and therefore a monitoring indicator such as element 48 in FIG. 4 will not be helpful. It may therefore be considered desirable to have an indicator such as meter 60 in order to compensate somewhat for the absence of this feature of the FIG. 4 embodiment. As the filters and opaque portions of disc 33 alternately pass in front of photodiode 25, the signal leaving signal conditioner 40 will vary froma zero-intensity indication to a nonzero-intensity indication and back again. Thus, a.c. meter 60 will indicate that an a.c. signal is present. However, if photodiode 25 or signal conditioner 40 fail, the most likely result will be that the apparatus will no longer be sensitive to the electromagnetic radiation, and a.c. meter 60 will indicate that no a.c. signal is present. Accordingly, a device such as meter 60 may prove valuable in investigating a burner shutdown.

Figure 7:
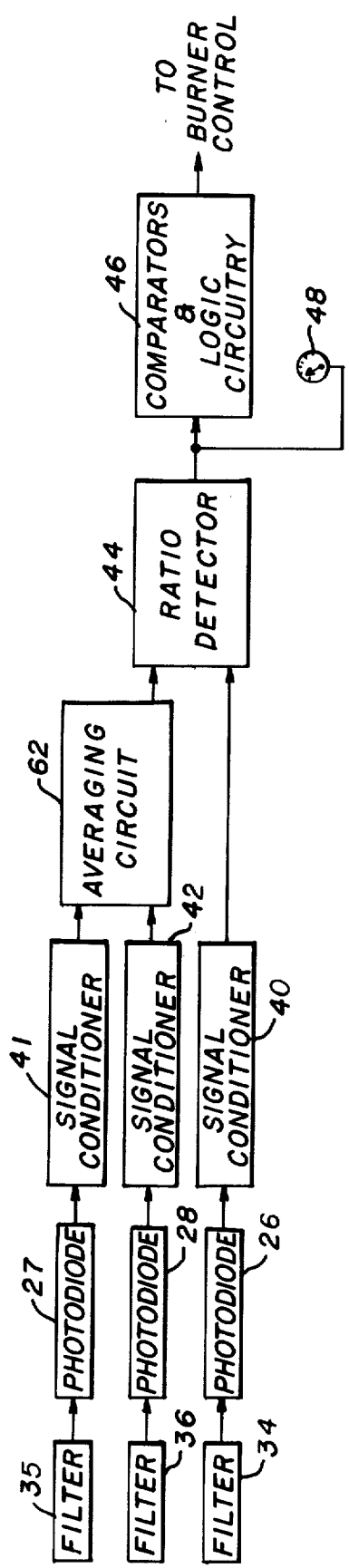
FIG. 7 is a diagram of yet another embodiment of the present invention.

While the method of the present invention applies both to petroleum-fired flames and coal-fired flames, the peak may not be as pronounced in the case of coal-fired flames. In such a case, the embodiment of FIG. 7 may be preferred. In this embodiment, a third filter 35 is used to detect the intensity of radiation of the wavelength corresponding to a lower valley 72 in FIG. 1. The intensities at the lower valley 72 and the upper valley 11 are averaged by averaging circuit 62 and the output of the averaging circuit is used as the reference intensity instead of the output of one filter only. This output constitutes a signal indicative of the intensity of electromagnetic radiation within two predetermined second spectra which reaches the means for producing the signal from locations in the path. The reference intensity will be closer than the value derived from using the intensity at only one valley to the intensity that would be expected at the peak wavelength if the radiation were from a non-flame-base source. This will permit the comparators 46 to make the finer distinctions that will be necessary in those cases in which the peak is less pronounced. With the exception of the averaging circuit and the extra filter 35, photodiode 27, and signal conditioner 41, the apparatus of FIG. 7 is the same as that depicted in FIG. 4. It can be appreciated that the method of FIG. 7 can also be applied, mutatis mutandis, to the apparatus of FIG. 5.

Figure 8:
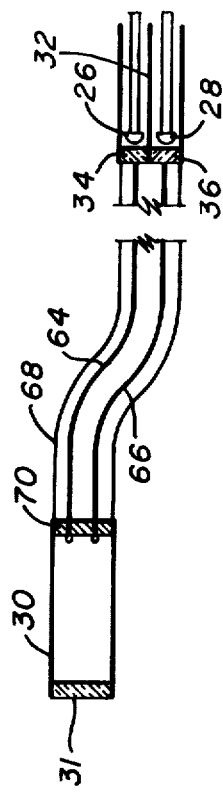
FIG. 8 is a diagram of a part of the embodiment of FIG. 4 adapted to the use of fiber optics.

Finally, a further refinement on electromagnetic-radiation collector 18 which is particularly applicable to tilting-burner applications can be seen in FIG. 8. In FIG. 8 tube 30 is again a means for restricting the path and is disposed in front of fiber-optic bundles 64 and 66, which are held in place by positioner 70, and which run through flexible guide pipe 68. The electromagnetic radiation is guided by bundles 64 and 66 to filters 34 and 36, which are at a remote stationary location, and the remainder of the operation is identical to that in FIG. 4.

While examples of the method and apparatus of the present invention have been shown in the instant specification, it is to be understood that the invention of the present disclosure is not limited to the examples presented.

What is claimed is:

1. An apparatus for discriminating between the presence in a selected position of a flame having a base and the presence of flame in nearby locations in a combustion area comprising:
   a. means for producing a first signal indicative of the intensity of any electromagnetic radiation within a predetermined first spectrum which reaches it from locations in a path comprising a set of locations which includes the location at which the base of the flame to be detected will occur if the flame is in the selected position and excludes the locations at which bases of the flames in the nearby locations will occur;
   b. means for producing a second signal indicative of the intensity of any electromagnetic radiation within at least one predetermined second spectrum which reaches it from locations in the path; and
   c. means receiving the first and second signals for producing a signal indicative of the ratio of the radiation intensities represented by the signals which it receives, the ratio indicating the presence of flame in the selected position when the ratio is within predetermined limits and indicating the absence of flame or the malfunction of the apparatus when the ratio is outside the limits.

2. The apparatus of claim 1 wherein the predetermined first spectrum includes a wavelength more characteristic of the base of the flame than of other parts of the flame.

3. The apparatus of claim 2 wherein the first spectrum includes a wavelength between 3100 and 3140 angstroms.

4. The apparatus of claim 3 wherein the second spectrum excludes a wavelength between 3100 and 3140 angstroms and includes wavelength between 3240 and 3280 angstroms.

5. A method of discriminating between the presence of flame in a selected position and the presence of a flame at nearby positions within a combustion area comprising:
   a. detecting electromagnetic radiation within a predetermined first spectrum which is emitted from locations in a path which comprises a set of locations which includes the location at which a base of a flame will occur if the flame is present in the selected position and excludes the locations at which bases of the flames in the nearby locations will occur;
   b. detecting the intensity of electromagnetic radiation within a predetermined second spectrum which is emitted from locations in the path; and
   c. computing the ratio of the magnitudes of the radiation intensities represented by the first and second signals, the ratio indicating the presence of flame in the selected position when the ratio is within predetermined limits and indicating either the absence of flame in the selected position or a malfunction of the apparatus when the ratio is outside the predetermined limits.

6. The method of claim 5 wherein the first spectrum includes a wavelength more characteristic of the base of the flame than of other parts of the flame.

7. The method of claim 6 wherein the first spectrum includes a wavelength between 3100 and 3140 angstroms.

8. The method of claim 7 in which the second spectrum includes a wavelength between 3240 and 3280 angstroms and excludes a wavelength between 3100 and 3140 angstroms.

* * * * *